US012680755B2

(12) United States Patent
Embry et al.

(10) Patent No.: US 12,680,755 B2
(45) Date of Patent: Jul. 14, 2026

(54) SOLVENT INJECTION FOR SOLIDS PREVENTION IN AN LNG PLANT

(71) Applicant: ConocoPhillips Company, Houston, TX (US)

(72) Inventors: Dale Embry, Houston, TX (US); Wesley R. Qualls, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 791 days.

(21) Appl. No.: 17/867,545

(22) Filed: Jul. 18, 2022

(65) Prior Publication Data

US 2023/0024241 A1    Jan. 26, 2023

Related U.S. Application Data

(60) Provisional application No. 63/222,743, filed on Jul. 16, 2021.

(51) Int. Cl.
*F25J 1/02* (2006.01)
*B01D 53/00* (2006.01)
(Continued)

(52) U.S. Cl.
CPC ......... *F25J 1/0255* (2013.01); *B01D 53/002* (2013.01); *C10L 3/10* (2013.01); *F25J 1/0022* (2013.01); *F25J 1/0215* (2013.01); *F25J 2210/04* (2013.01); *F25J 2210/60* (2013.01); *F25J 2280/40* (2013.01)

(58) Field of Classification Search
CPC ......... B01D 53/002; C10L 3/10; F25J 1/0022; F25J 1/004; F25J 1/0052; F25J 1/0085; F25J 1/0087; F25J 1/021; F25J 1/0215; F25J 1/0255
See application file for complete search history.

(56) References Cited

U.S. PATENT DOCUMENTS 3,001,372 A    9/1961    Fred et al.
3,283,521 A    11/1966    Alexander et al.
(Continued)

OTHER PUBLICATIONS

International Search Report and the Written Opinion of the International Searching Authority for International Application No. PCT/US22/37498 dated Oct. 25, 2022 (8 pages).

*Primary Examiner* — Sharon Pregler
(74) *Attorney, Agent, or Firm* — Polsinelli PC

(57) ABSTRACT

A solvent is dispersed into a natural gas feed at a solvent injection point to produce a mixed feed. The mixed feed contains heavy components with a potentially fouling portion that can cause obstructions in a heat exchanger. A fluid injection system can inject the solvent intermittently, for instance, based on an amount of accumulation or expected accumulation of heavy component solids in the heat exchanger. The solvent prevents the potentially fouling portion of the heavy components from freezing, melts or dissolves the accumulation, and reduces the obstructions in the heat exchanger. The fluid injection system includes a solvent supply, an optional atomizer, an injection controller, optionally one or more sensors, and/or optionally a heater. The solvent injection system can disperse the solvent onto a flow surface for the natural gas feed and/or mixed feed to form a solvent film which further reduces heavy component solids.

19 Claims, 7 Drawing Sheets

(51) Int. Cl.
  C10L 3/10      (2006.01)
  F25J 1/00      (2006.01)

(56)              References Cited

U.S. PATENT DOCUMENTS

| | | | |
|---|---|---|---|
| 4,575,387 | A | 3/1986 | Larue et al. |
| 6,539,747 | B2 | 4/2003 | Minta et al. |
| 7,442,847 | B2 | 10/2008 | Gaskin |
| 2015/0260348 | A1 | 9/2015 | Talley et al. |
| 2017/0176099 | A1* | 6/2017 | Gaskin .................... F25J 3/064 |
| 2020/0340741 | A1 | 10/2020 | Calderon et al. |

* cited by examiner

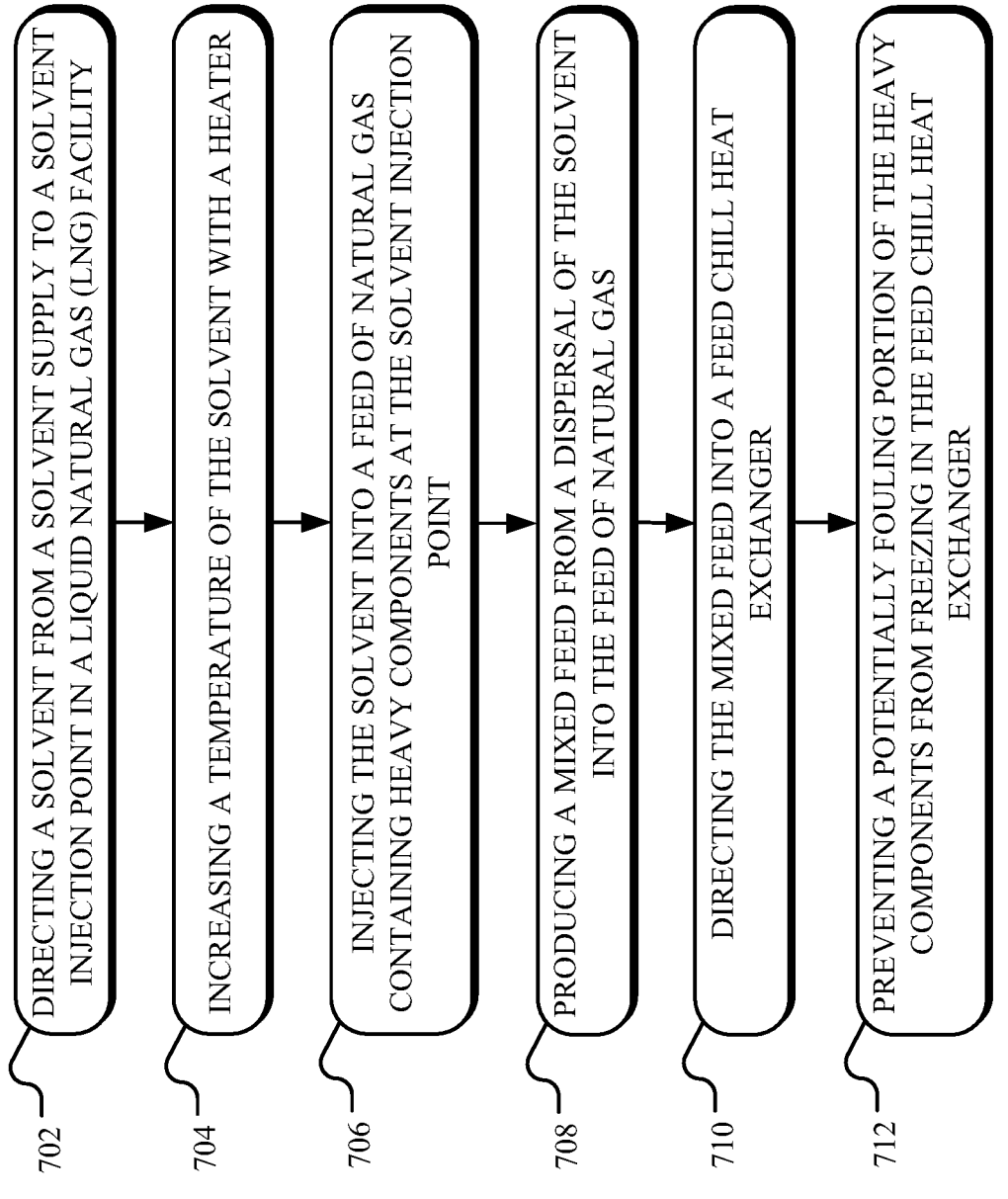

702 DIRECTING A SOLVENT FROM A SOLVENT SUPPLY TO A SOLVENT INJECTION POINT IN A LIQUID NATURAL GAS (LNG) FACILITY

704 INCREASING A TEMPERATURE OF THE SOLVENT WITH A HEATER

706 INJECTING THE SOLVENT INTO A FEED OF NATURAL GAS CONTAINING HEAVY COMPONENTS AT THE SOLVENT INJECTION POINT

708 PRODUCING A MIXED FEED FROM A DISPERSAL OF THE SOLVENT INTO THE FEED OF NATURAL GAS

710 DIRECTING THE MIXED FEED INTO A FEED CHILL HEAT EXCHANGER

712 PREVENTING A POTENTIALLY FOULING PORTION OF THE HEAVY COMPONENTS FROM FREEZING IN THE FEED CHILL HEAT EXCHANGER

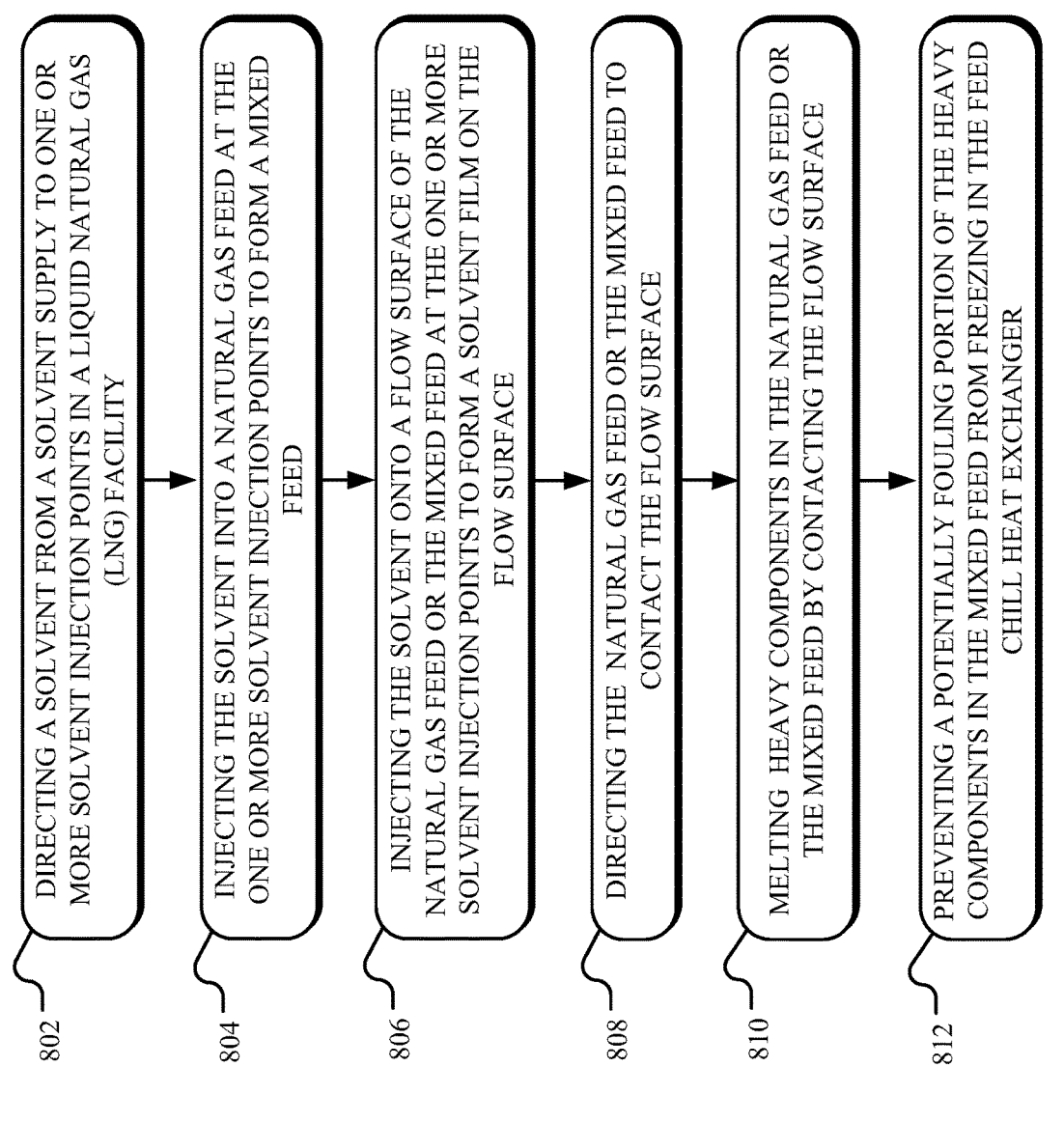

802 — DIRECTING A SOLVENT FROM A SOLVENT SUPPLY TO ONE OR MORE SOLVENT INJECTION POINTS IN A LIQUID NATURAL GAS (LNG) FACILITY

804 — INJECTING THE SOLVENT INTO A NATURAL GAS FEED AT THE ONE OR MORE SOLVENT INJECTION POINTS TO FORM A MIXED FEED

806 — INJECTING THE SOLVENT ONTO A FLOW SURFACE OF THE NATURAL GAS FEED OR THE MIXED FEED AT THE ONE OR MORE SOLVENT INJECTION POINTS TO FORM A SOLVENT FILM ON THE FLOW SURFACE

808 — DIRECTING THE NATURAL GAS FEED OR THE MIXED FEED TO CONTACT THE FLOW SURFACE

810 — MELTING HEAVY COMPONENTS IN THE NATURAL GAS FEED OR THE MIXED FEED BY CONTACTING THE FLOW SURFACE

812 — PREVENTING A POTENTIALLY FOULING PORTION OF THE HEAVY COMPONENTS IN THE MIXED FEED FROM FREEZING IN THE FEED CHILL HEAT EXCHANGER

SOLVENT INJECTION FOR SOLIDS PREVENTION IN AN LNG PLANT

CROSS-REFERENCE TO RELATED APPLICATIONS

The present application claims priority to U.S. Provisional Patent Application 63/222,743 filed on Jul. 16, 2021, which is incorporated by reference in its entirety herein.

TECHNICAL FIELD

Aspects of the present disclosure relate generally to systems and methods for liquefaction of natural gas and more particularly to melting, preventing, and eliminating freezing solids during processing of liquefied natural gas (LNG) through solvent injection.

BACKGROUND

Natural gas is a commonly used resource comprised of a mixture of naturally occurring hydrocarbon gases typically found in deep underground natural rock formations or other hydrocarbon reservoirs. More particularly, natural gas is primarily comprised of methane and often includes other components, such as, ethane, propane, carbon dioxide, nitrogen, hydrogen sulfide, and/or the like.

Cryogenic liquefaction generally converts the natural gas into a convenient form for transportation and storage. More particularly, under standard atmospheric conditions, natural gas exists in vapor phase and is subjected to certain thermodynamic processes to produce LNG. Liquefying natural gas greatly reduces its specific volume, such that large quantities of natural gas can be economically transported and stored in liquefied form.

Some of the thermodynamic processes generally utilized to produce LNG involve cooling the natural gas to near atmospheric vapor pressure. For example, a natural gas stream may be sequentially passed at an elevated pressure through multiple cooling stages that cool the gas to successively lower temperatures until the liquefaction temperature is reached. Stated differently, the natural gas stream is cooled through indirect heat exchange with one or more refrigerants, such as propane, propylene, ethane, ethylene, methane, nitrogen, carbon dioxide, and/or the like, and expanded to near atmospheric pressure.

During cooling of the processed natural gas stream, trace amounts of intermediate components, such as propanes, butanes, and pentanes, and heavy hydrocarbon components ("heavies"), such as C12 to C16 hydrocarbons, often freeze in downstream systems of an LNG plant, including heat exchangers. As these components freeze during the cooling process, deposits buildup on internal surfaces of various systems of the LNG plant. Such fouling may result in a shutdown of one or more systems of the LNG plant to remove the deposits, resulting in a loss of production. For example, conventional LNG plants may experience an increase in pressure drop in a chilling area of the LNG train, such as a heat exchanger. The pressure drop may increase beyond system constraints unless train throughput is curtailed and eventually shutdown to derime the heat exchanger to remove deposits. Conventionally, the cycle of pressure drop increase, feed curtailment, shutdown, and deriming of the heat exchanger continues as a result of fouling.

It is with these observations in mind, among others, that various aspects of the present disclosure were conceived and developed.

SUMMARY

Implementations described and claimed herein address the foregoing problems by providing systems and methods for processing liquefied natural gas (LNG) and/or Natural Gas Liquids (NGL) extraction. In one implementation, a method for reducing hydrocarbon fouling comprises: injecting a solvent into a feed of natural gas at a solvent injection point, the feed containing heavy components; producing a mixed feed from a dispersal of the solvent into the feed of natural gas, the mixed feed containing the heavy components; directing the mixed feed into a feed chiller heat exchanger; and preventing the heavy components of the mixed feed from freezing into a fouling portion in the feed chiller heat exchanger using the solvent.

In some instances, the mixed feed includes between one and 10,000 parts per million by weight of the solvent. The solvent can include one or more of isoparaffins, isoolefins, isobutane, isooctane, isodecane, isododecane, isotetradecane, isohexadecane, diisobutylene, tri-isobutylene, tetraisobutylene, petroleum naphtha, kerosene, cold weather diesel and/or the solvent has a first boiling point that corresponds with a boiling point of a contaminant C7 to C13 hydrocarbon. The dispersal of the solvent into the feed of natural gas can include dispersing the solvent into the feed of natural gas with an open port for injection or an injection nozzle. The dispersal of the solvent into the feed of natural gas can include a liquid atomization process to add the solvent into the feed of natural gas. The liquid atomization process can include increasing a pressure or a temperature of the solvent prior to adding the solvent into the feed of natural gas. The method can further comprise injecting the solvent onto a flow surface that conveys the feed of natural gas to form a film of the solvent on the flow surface.

In some implementations, injecting the solvent into the feed of natural gas includes a plurality of intermittent injections of the solvent at the solvent injection point or injection points. For instance, the method could further include determining an amount of an accumulation of solids in the feed chiller heat exchanger, wherein a timing of the plurality of intermittent injections is based at least partly on the amount of the accumulation of solids. The method can comprise melting, with the mixed feed, the accumulation of solids in the feed chiller heat exchanger. The feed chiller heat exchanger can be in an operating mode during the melting of the accumulation of solids.

In some examples, the mixed feed is a first mixed feed and the method further comprises outputting, from feed the chiller heat exchanger, a second mixed feed including the fouling portion of the heavy components. A concentration of the solvent in the second mixed feed can prevent the fouling portion of the heavy components from freezing downstream of the feed chiller heat exchanger. In some instances, the feed chiller heat exchanger is a propane feed chiller and/or an ethylene feed chiller of a cascading liquid natural gas (LNG) system. Moreover, the solvent can be a first solvent, the solvent injection point can be a first solvent injection point, and the method can further comprise injecting a second solvent into the feed of natural gas at a second solvent injection point, the second solvent being a different solvent than the first solvent.

In some implementations, a system is adapted to carry out any of the methods discussed herein. The system can include any of the components discussed herein. In some instances, the system comprises an injection system injecting the solvent into the feed of natural gas; and a propane feed chiller, an ethylene feed chiller, an ethylene feed condenser, a debutanizer, or a heavies removal column to receive the mixed feed.

Other implementations are also described and recited herein. Further, while multiple implementations are disclosed, still other implementations of the presently disclosed technology will become apparent to those skilled in the art from the following detailed description.

BRIEF DESCRIPTION OF THE DRAWINGS

The foregoing summary, as well as the following detailed description, will be better understood when read in conjunction with the appended drawings. For the purpose of illustration, there is shown in the drawings certain examples of the presently disclosed technology. It should be understood, however, that the presently disclosed technology is not limited to the precise examples and features shown. The presently disclosed technology is capable of modifications in various aspects, all without departing from the spirit and scope of the presently disclosed technology. Accordingly, the drawings and detailed description are to be regarded as illustrative in nature and not limiting. The accompanying drawings, which are incorporated in and constitute a part of this specification, illustrate implementations of apparatuses consistent with the presently disclosed technology and, together with the description, serves to explain advantages and principles consistent with the presently disclosed technology, in which:

FIG. 5 illustrates an example method of solvent injection to prevent heavy components from freezing in a feed chill heat exchanger;

FIG. 6 illustrates an example method of solvent injection to prevent heavy components from freezing in a feed chill heat exchanger and on a flow surface.

DETAILED DESCRIPTION

Figure 1:
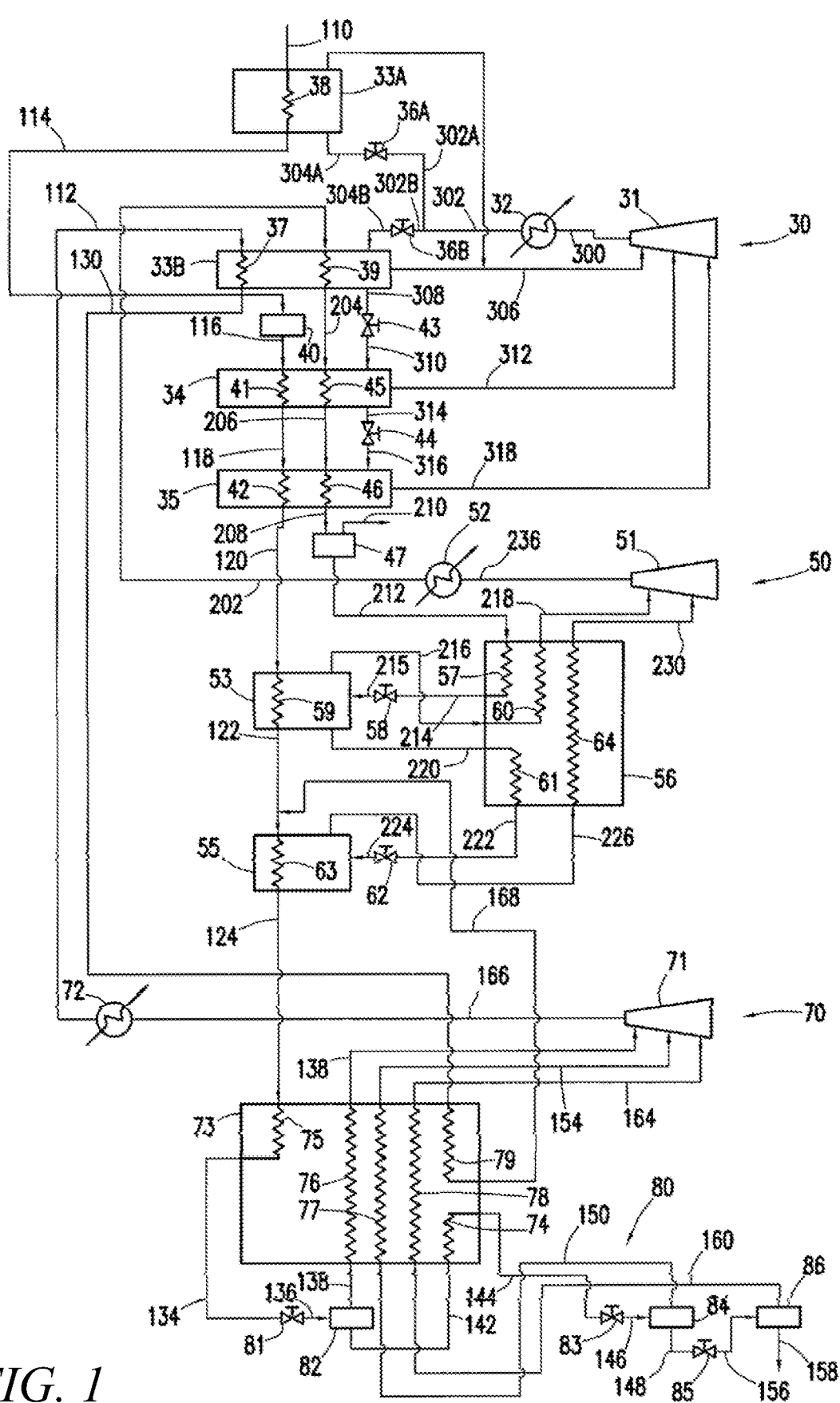
FIG. 1 illustrates an example simplified flow diagram of a cascade refrigeration process with a solvent injection for LNG production.

The present disclosure involves systems and methods of solvent injection for LNG production. In one aspect, freezing during processing of liquefied natural gas (LNG) is eliminated or significantly reduced by injecting a solvent into a natural gas feed. The natural gas feed includes heavy components, some of which could freeze and form solid accumulations in the heat exchanger, causing fouling in the heat exchanger. However, by injecting the solvent into the natural gas feed to produce a mixed feed and directing the mixed feed into the heat exchanger, the potentially fouling portion of the heavy components is prevented from freezing. For instance, a freezing temperature of the heavy components can be depressed below a temperature that the mixed feed reaches in the heat exchanger. As such, an amount of accumulation of heavy component solids in the heat exchanger is significantly reduced or eliminated.

In some instances, the LNG processing system includes a solvent injection system with a solvent supply and optionally an atomizer for dispersing the solvent from the solvent supply into the natural gas feed at an injection point (e.g., upstream of a feed chill heat exchanger). An injection controller can control a timing of the dispersal by controlling a flow of a solvent feed through an atomizer, for instance, based on sensor data received from one or more sensors and/or through means other than sensors such as adjusting the stroke on a positive displacement injection pump to inject the required amount of solvent. The sensor data can indicate characteristics of the heat exchanger, the mixed feed, and/or the dispersal (e.g., temperature, flow rate, etc.). The sensor data can indicate an amount of accumulation of heavy component solids in the heat exchanger. The injection controller can base the timing of intermittent injections of the solvent into the natural gas feed on the sensor data.

In some examples, the solvent injection system disperses the solvent onto a flow surface for the natural gas feed or the mixed feed. The solvent can form a solvent film, for instance, coating an inner surface of a conduit or the heat exchanger. The solvent film can further reduce or eliminate heavy component solids from the natural gas feed and mixed feed by melting heavy component solids in the natural gas feed or mixed feed that come in contact with the solvent film. The solvent injection system can include a single solvent injection point or multiple solvent injection points distributed throughout the LNG processing system for providing multiple modified injections of solvents (e.g., which may vary in temperatures, injection timing, solvent concentrations, and/or solvent type). As such, the solvent injection system can reduce or eliminate accumulations of heavy component solids in multiple heat exchangers and on multiple flow surfaces of the LNG processing system.

Moreover, the heavy component solids accumulations can be reduced or eliminated while the heat exchangers are operational and without causing downtime. The mixed fluid is sent into the heat exchanger during a heat exchange process for cooling the natural gas feed (e.g., converted into the mixed feed) with minimal interruption to the heat exchange process. The solvent is injected into the natural gas feed upstream from the heat exchanger while the heat exchange process is ongoing. The technology disclosed herein avoids shutting down the heat exchanger to remove heavy component accumulations. Additionally, using the solvent injection process to reduce or eliminate accumulations of heavy component solids can also reduce a need to remove the heavy components from the natural gas feed at other stages of LNG processing. As such, obstructions in the heat exchangers can be reduced while avoiding downtime and improving the overall operating efficiency of the LNG processing facility.

In some examples, the technology disclosed herein may be used in any liquefaction/cryogenic separation process with heavies removal beyond LNG facilities, such as gas plants, air separation, industrial processes, and the like. Any processes that use Heavy Removal Units (HRU) may benefit from injection/separation process. The technology disclosed herein can extend the Heavies Removal Unit (HRU) range, preventing freezing upstream of the HRU. The injector/separator can be placed at any point in the process ahead of the HRU. The solvents can be recovered/recycled at the HRU along with any heavy contaminants that may cause freezing. In some instances, as the contaminants change, the solvent may be changed over time to correspond to the change in the contaminants. The rate and frequency of solvent use can be monitored and changed in response to heat exchanger flow. For instance, If the heat exchanger performance starts to decrease, the amount of solvent injection rate can be increased an amount corresponding to an amount of heat exchanger performance decrease.

In some instances, additional benefits can result because any contaminant that makes it through the separator instead of dropping with liquids can be admixed with the solvent thus reducing the freezing point and allowing the solvent to proceed through the system with the contaminant to prevent freezing during other intermediate steps until the solvent/contaminant mixture is removed at the HRU. The point of solvent injection may be at any point before the HRU, the separator may be located downstream of the injection point but upstream of the HRU. The separator vessels can be inserted between any cooling stage. The contaminants can be monitored by molecular weight in the incoming feed and the solvent can be adjusted to match contaminant (e.g., based on the molecular weight or boiling point).

Accordingly, the presently disclosed technology reliably prevents hydrocarbon freezing and/or provides a means to remove frozen hydrocarbon components in chilling and liquefaction areas of the LNG processing system and provides a customizable system that can prevent freezing among various other components of LNG train architectures. Other advantages will be apparent from the present disclosure.

I. Terminology

The liquefaction process described herein may incorporate one or more of several types of cooling systems and methods including, but not limited to, indirect heat exchange, vaporization, and/or expansion or pressure reduction.

Indirect heat exchange, as used herein, refers to a process involving a cooler stream cooling a substance without actual physical contact between the cooler stream and the substance to be cooled. Specific examples of indirect heat exchange include, but are not limited to, heat exchange undergone in a shell-and-tube heat exchanger, a core-in-shell heat exchanger, and a brazed aluminum plate-fin heat exchanger. The specific physical state of the refrigerant and substance to be cooled can vary depending on demands of the refrigeration system and type of heat exchanger chosen.

Expansion or pressure reduction cooling refers to cooling which occurs when the pressure of a gas, liquid or a two-phase system is decreased by passing through a pressure reduction means. In some implementations, expansion means may be a Joule-Thomson expansion valve. In other implementations, the expansion means may be either a hydraulic or gas expander. Because expanders recover work energy from the expansion process, lower process stream temperatures are possible upon expansion.

In the description, phraseology and terminology are employed for the purpose of description and should not be regarded as limiting. For example, the use of a singular term, such as "a", is not intended as limiting of the number of items. Also, the use of relational terms such as, but not limited to, "down" and "up" or "downstream" and "upstream", are used in the description for clarity in specific reference to the figures and are not intended to limit the scope of the presently disclosed technology or the appended claims. Further, any one of the features of the presently disclosed technology may be used separately or in combination with any other feature. For example, references to the term "implementation" means that the feature or features being referred to are included in at least one aspect of the presently disclosed technology. Separate references to the term "implementation" in this description do not necessarily refer to the same implementation and are also not mutually exclusive unless so stated and/or except as will be readily apparent to those skilled in the art from the description. For example, a feature, structure, process, step, action, or the like described in one implementation may also be included in other implementations but is not necessarily included. Thus, the presently disclosed technology may include a variety of combinations and/or integrations of the implementations described herein. Additionally, all aspects of the presently disclosed technology as described herein are not essential for its practice.

Lastly, the terms "or" and "and/or" as used herein are to be interpreted as inclusive or meaning any one or any combination. Therefore, "A, B or C" or "A, B and/or C" mean any of the following: "A"; "B"; "C"; "A and B"; "A and C"; "B and C"; or "A, B and C." An exception to this definition will occur only when a combination of elements, functions, steps or acts are in some way inherently mutually exclusive.

II. General Architecture and Operations

Some LNG projects introduce pipelines as a source of feed gas in an LNG Optimized Cascade Process (OCP). The Optimized Cascade Process is based on three multi-staged, cascading refrigerants circuits using pure refrigerants, brazed aluminum heat exchangers and insulated cold box modules. Pure or predominately pure refrigerants of propane (or propylene), ethylene, and methane may be utilized.

The Optimized Cascade Process sometimes sends a natural gas feed to a feed chill heat exchanger after amine treatment and dehydration. C6+ hydrocarbons (i.e. heavy components) can still be in the natural gas feed so the Optimized Cascade Process uses a heavies removal distillation column (heavies removal unit or HRU) to eliminate heavy components from the natural gas prior to condensing the gas to LNG. In the usual case, the gas has already been amine treated and dehydrated prior to heavies removal. Heavies removal is done to prevent freezing from occurring in the liquefaction heat exchangers and to moderate the heating value of the LNG.

The presently disclosed technology may be implemented in a cascade LNG system employing a cascade-type refrigeration process using one or more predominately pure component refrigerants. The refrigerants utilized in cascade-type refrigeration processes can have successively lower boiling points to facilitate heat removal from the natural gas stream that is being liquefied. Additionally, cascade-type refrigeration processes can include some level of heat integration. For example, a cascade-type refrigeration process can cool one or more refrigerants having a higher volatility through indirect heat exchange with one or more refrigerants having a lower volatility. In addition to cooling the natural gas stream through indirect heat exchange with one or more refrigerants, cascade and mixed-refrigerant LNG systems can employ one or more expansion cooling stages to simultaneously cool the LNG while reducing its pressure.

In one implementation, the LNG process may employ a cascade-type refrigeration process that uses a plurality of multi-stage cooling cycles, each employing a different refrigerant composition, to sequentially cool the natural gas stream to lower and lower temperatures. For example, a first refrigerant may be used to cool a first refrigeration cycle. A second refrigerant may be used to cool a second refrigeration cycle. A third refrigerant may be used to cool a third refrigeration cycle. Each refrigeration cycle may include a closed cycle or an open cycle. The terms "first", "second", and "third" refer to the relative position of a refrigeration cycle. For example, the first refrigeration cycle is positioned just upstream of the second refrigeration cycle while the second refrigeration cycle is positioned upstream of the third refrigeration cycle and so forth. While at least one reference to a cascade LNG process comprising three different refrigerants in three separate refrigeration cycles is made, this is not intended to be limiting. It is recognized that a cascade LNG process involving any number of refrigerants and/or refrigeration cycles may be compatible with one or more implementations of the presently disclosed technology. Other variations to the cascade LNG process are also contemplated. It will also be appreciated that the presently disclosed technology may be utilized in non-cascade LNG processes. One example of a non-cascade LNG process involves a mixed refrigerant LNG process that employs a combination of two or more refrigerants to cool the natural gas stream in at least one cooling cycle.

Figure 2:
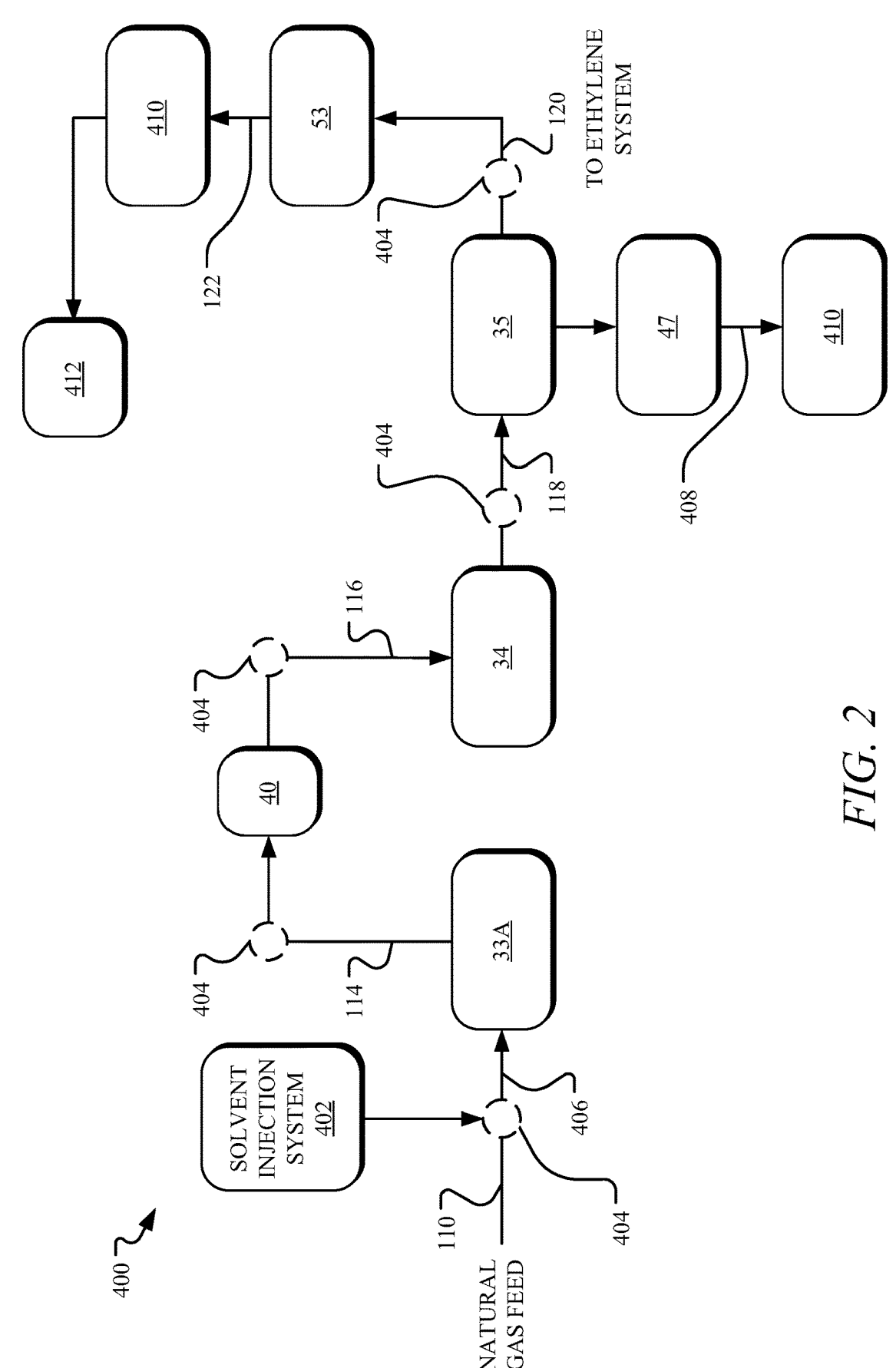
FIG. 2 illustrates an example LNG production system for injecting a solvent into a natural gas feed with a solvent injection system.

To begin a detailed description of an example cascade LNG facility 100 in accordance with the implementations described herein, reference is made to FIG. 1. The LNG facility 100 generally comprises a first refrigeration cycle 30 (e.g., a propane refrigeration cycle), aa second refrigeration cycle 50 (e.g., an ethylene refrigeration cycle), and a third refrigeration cycle 70 (e.g., a methane refrigeration cycle) with an expansion section 80. FIG. 2 illustrates shows an example LNG production system 400 with dry gas solvent injection that may be integrated with an LNG producing facility, such as the LNG facility 100. Other implementations of example LNG production systems are illustrated in FIGS. 5-9 and may be similarly integrated with an LNG producing facility, such as the LNG facility 100. Those skilled in the art will recognize that FIGS. 1-2 and 5-9 are schematics only and, therefore, various equipment, apparatuses, or systems that would be needed in a commercial plant for successful operation have been omitted for clarity. Such components might include, for example, compressor controls, flow and level measurements and corresponding controllers, temperature and pressure controls, pumps, motors, filters, additional heat exchangers, valves, and/or the like. Those skilled in the art will recognize such components and how they are integrated into the systems and methods disclosed herein.

In one implementation, the main components of propane refrigeration cycle 30 include a propane compressor 31, a propane cooler/condenser 32, high-stage propane chillers 33A and 33B, an intermediate-stage propane chiller 34, and a low-stage propane chiller 35. The main components of ethylene refrigeration cycle 50 include an ethylene compressor 51, an ethylene cooler 52, a high-stage ethylene chiller 53, a low-stage ethylene chiller/condenser 55, and an ethylene economizer 56. The main components of methane refrigeration cycle 70 include a methane compressor 71, a methane cooler 72, and a methane economizer 73. The main components of expansion section 80 include a high-stage methane expansion valve and/or expander 81, a high-stage methane flash drum 82, an intermediate-stage methane expansion valve and/or expander 83, an intermediate-stage methane flash drum 84, a low-stage methane expansion valve and/or expander 85, and a low-stage methane flash drum 86. While "propane," "ethylene," and "methane" are used to refer to respective first, second, and third refrigerants, it should be understood that these are examples only, and the presently disclosed technology may involve any combination of suitable refrigerants.

Referring to FIG. 1, in one implementation, operation of the LNG facility 100 begins with the propane refrigeration cycle 30. Propane is compressed in a multi-stage (e.g., three-stage) propane compressor 31 driven by, for example, a gas turbine driver (not illustrated). The stages of compression may exist in a single unit or a plurality of separate units mechanically coupled to a single driver. Upon compression, the propane is passed through a conduit 300 to a propane cooler 32 where the propane is cooled and liquefied through indirect heat exchange with an external fluid (e.g., air or water). A portion of the stream from the propane cooler 32 can then be passed through conduits 302 and 302A to a pressure reduction system 36A, for example, an expansion valve, as illustrated in FIG. 1. At the pressure reduction system 36A, the pressure of the liquefied propane is reduced, thereby evaporating or flashing a portion of the liquefied propane. A resulting two-phase stream then flows through a conduit 304A into a high-stage propane chiller 33A, which cools the natural gas stream in indirect heat exchange 38. A high stage propane chiller 33A uses the flashed propane refrigerant to cool the incoming natural gas stream in a conduit 110. Another portion of the stream from the propane cooler 32 is routed through a conduit 302B to another pressure reduction system 36B, illustrated, for example, in FIG. 1 as an expansion valve. At the pressure reduction system 36B, the pressure of the liquefied propane is reduced in a stream 304B.

The cooled natural gas stream from the high-stage propane chiller 33A flows through a conduit 114 to a separation vessel. At the separation vessel, water and in some cases a portion of the propane and/or heavier components are removed. In some cases, where removal is not completed in upstream processing, a treatment system 40 may follow the separation vessel. The treatment system 40 removes moisture, mercury and mercury compounds, particulates, and other contaminants to create a treated stream. The stream exits the treatment system 40 through a conduit 116. The stream 116 then enters the intermediate-stage propane chiller 34. At the intermediate-stage propane chiller 34, the stream is cooled in indirect heat exchange 41 via indirect heat exchange with a propane refrigerant stream. The resulting cooled stream output into a conduit 118 is routed to the low-stage propane chiller 35, where the stream can be further cooled through indirect heat exchange means 42. The resultant cooled stream exits the low-stage propane chiller 35 through a conduit 120. Subsequently, the cooled stream in the conduit 120 is routed to the high-stage ethylene chiller 53.

A vaporized propane refrigerant stream exiting the high-stage propane chillers 33A and 33B is returned to a high-stage inlet port of the propane compressor 31 through a conduit 306. An unvaporized propane refrigerant stream exits the high-stage propane chiller 33B via a conduit 308 and is flashed via a pressure reduction system 43, illustrated in FIG. 1 as an expansion valve, for example. The liquid propane refrigerant in the high-stage propane chiller 33A provides refrigeration duty for the natural gas stream. A two-phase refrigerant stream enters the intermediate-stage propane chiller 34 through a conduit 310, thereby providing coolant for the natural gas stream (in conduit 116) and the stream entering the intermediate-stage propane chiller 34 through a conduit 204. The vaporized portion of the propane refrigerant exits the intermediate-stage propane chiller 34 through a conduit 312 and enters an intermediate-stage inlet port of the propane compressor 31. The liquefied portion of the propane refrigerant exits the intermediate-stage propane chiller 34 through a conduit 314 and is passed through a pressure-reduction system 44, for example an expansion valve, whereupon the pressure of the liquefied propane refrigerant is reduced to flash or vaporize a portion of the liquefied propane. The resulting vapor-liquid refrigerant stream is routed to the low-stage propane chiller 35 through a conduit 316. At the low-stage propane chiller 35, the refrigerant stream cools the methane-rich stream and an ethylene refrigerant stream entering the low-stage propane chiller 35 through the conduits 118 and 206, respectively. In some instances, liquids of the feed can be removed via a removal system (e.g., including a separator connected to conduits 118). The vaporized propane refrigerant stream exits the low-stage propane chiller 35 and is routed to a low-stage inlet port of the propane compressor 31 through a conduit 318. The vaporized propane refrigerant stream is compressed and recycled at the propane compressor 31 as previously described.

In one implementation, a stream of ethylene refrigerant in a conduit 202 enters the high-stage propane chiller 33B. At the high-stage propane chiller 33B, the ethylene stream is cooled through indirect heat exchange 39. The resulting cooled ethylene stream is routed in the conduit 204 from the high-stage propane chiller 33B to the intermediate-stage propane chiller 34. Upon entering the intermediate-stage propane chiller 34, the ethylene refrigerant stream may be further cooled through indirect heat exchange 45 in the intermediate-stage propane chiller 34. The resulting cooled ethylene stream exits the intermediate-stage propane chiller 34 and is routed through a conduit 206 to enter the low-stage propane chiller 35. In the low-stage propane chiller 35, the ethylene refrigerant stream is at least partially condensed, or condensed in its entirety, through indirect heat exchange 46. The resulting stream exits the low-stage propane chiller 35 through a conduit 208 and may be routed to a separation vessel 47. At the separation vessel 47, a vapor portion of the stream, if present, is removed through a conduit 210, while a liquid portion of the ethylene refrigerant stream exits the separator 47 through a conduit 212. The liquid portion of the ethylene refrigerant stream exiting the separator 47 may have a representative temperature and pressure of about −24° F. (about −31° C.) and about 285 psi (about 1,965 kPa). However, other temperatures and pressures are contemplated.

Turning now to the ethylene refrigeration cycle 50 in the LNG facility 100, in one implementation, the liquefied ethylene refrigerant stream in the conduit 212 enters an ethylene economizer 56, and the stream is further cooled by an indirect heat exchange 57 at the ethylene economizer 56. The resulting cooled liquid ethylene stream is output into a conduit 214 and routed through a pressure reduction system 58, such as an expansion valve. The pressure reduction system 58 reduces the pressure of the cooled predominantly liquid ethylene stream to flash or vaporize a portion of the stream. The cooled, two-phase stream in a conduit 215 enters the high-stage ethylene chiller 53. In the high-stage ethylene chiller 53, at least a portion of the ethylene refrigerant stream vaporizes to further cool the stream in the conduit 120 entering an indirect heat exchange 59. Various liquids can also be removed via a separator connected to conduit 120. The vaporized and remaining liquefied ethylene refrigerant exits the high-stage ethylene chiller 53 through conduits 216 and 220, respectively. The vaporized ethylene refrigerant in the conduit 216 may re-enter the ethylene economizer 56, and the ethylene economizer 56 warms the stream through an indirect heat exchange 60 prior to entering a high-stage inlet port of the ethylene compressor 51 through a conduit 218. Ethylene is compressed in multi-stages (e.g., three-stage) at the ethylene compressor 51 driven by, for example, a gas turbine driver (not illustrated).

The stages of compression may exist in a single unit or a plurality of separate units mechanically coupled to a single driver.

The cooled stream in the conduit 120 exiting the low-stage propane chiller 35 is routed to the high-stage ethylene chiller 53, where it is cooled via the indirect heat exchange 59 of the high-stage ethylene chiller 53. Additionally or alternatively, a separator can connect to conduit 120 to perform a liquids removal at this stage. The remaining liquefied ethylene refrigerant exiting the high-stage ethylene chiller 53 in a conduit 220 may re-enter the ethylene economizer 56 and undergo further sub-cooling by an indirect heat exchange 61 in the ethylene economizer 56. The resulting sub-cooled refrigerant stream exits the ethylene economizer 56 through a conduit 222 and passes a pressure reduction system 62, such as an expansion valve, whereupon the pressure of the refrigerant stream is reduced to vaporize or flash a portion of the refrigerant stream. The resulting, cooled two-phase stream in a conduit 224 enters the low-stage ethylene chiller/condenser 55.

A portion of the cooled natural gas stream exiting the high-stage ethylene chiller 53 is routed through conduit a 122 to enter an indirect heat exchange 63 of the low-stage ethylene chiller/condenser 55. Furthermore, in some examples, the conduit 122 from the high-stage ethylene chiller 53 routes the portion of the cooled natural gas to a Heavies Removal Unit (HRU), such as the HRU 410 depicted in FIG. 2. At the HRU 410, heavies in the cooled natural gas stream can be removed as part of a condensate, and the "clean" gas is processed further, as discussed below. For instance, in the low-stage ethylene chiller/condenser 55, the cooled and/or "clean" stream is at least partially condensed and, often, subcooled through indirect heat exchange with the ethylene refrigerant entering the low-stage ethylene chiller/condenser 55 through the conduit 224. The vaporized ethylene refrigerant exits the low-stage ethylene chiller/condenser 55 through a conduit 226, which then enters the ethylene economizer 56. In the ethylene economizer 56, vaporized ethylene refrigerant stream is warmed through an indirect heat exchange 64 prior to being fed into a low-stage inlet port of the ethylene compressor 51 through a conduit 230. As shown in FIG. 1, a stream of compressed ethylene refrigerant exits the ethylene compressor 51 through a conduit 236 and subsequently enters the ethylene cooler 52. At the ethylene cooler 52, the compressed ethylene stream is cooled through indirect heat exchange with an external fluid (e.g., water or air). The resulting cooled ethylene stream may be introduced through the conduit 202 into high-stage propane chiller 33B for additional cooling, as previously described.

The condensed and, often, sub-cooled liquid natural gas stream exiting the low-stage ethylene chiller/condenser 55 in a conduit 124 can also be referred to as a "pressurized LNG-bearing stream." This pressurized LNG-bearing stream exits the low-stage ethylene chiller/condenser 55 through the conduit 124 prior to entering a main methane economizer 73. In the main methane economizer 73, methane-rich stream in the conduit 124 may be further cooled in an indirect heat exchange 75 through indirect heat exchange with one or more methane refrigerant streams (e.g., 76, 77, 78). The cooled, pressurized LNG-bearing stream exits the main methane economizer 73 through a conduit 134 and is routed to the expansion section 80 of the methane refrigeration cycle 70. In the expansion section 80, the pressurized LNG-bearing stream first passes through a high-stage methane expansion valve or expander 81, whereupon the pressure of this stream is reduced to vaporize or flash a portion thereof. The resulting two-phase methane-rich stream in a conduit 136 enters into a high-stage methane flash drum 82. In the high-stage methane flash drum 82, the vapor and liquid portions of the reduced-pressure stream are separated. The vapor portion of the reduced-pressure stream (also called the high-stage flash gas) exits the high-stage methane flash drum 82 through a conduit 138 and enters into the main methane economizer 73. At the main methane economizer 73, at least a portion of the high-stage flash gas is heated through the indirect heat exchange means 76 of the main methane economizer 73. The resulting warmed vapor stream exits the main methane economizer 73 through the conduit 138 and is routed to a high-stage inlet port of the methane compressor 71, as shown in FIG. 1.

The liquid portion of the reduced-pressure stream exits the high-stage methane flash drum 82 through a conduit 142 and re-enters the main methane economizer 73. The main methane economizer 73 cools the liquid stream through indirect heat exchange 74 of the main methane economizer 73. The resulting cooled stream exits the main methane economizer 73 through a conduit 144 and is routed to a second expansion stage, illustrated in FIG. 1 as intermediate-stage expansion valve 83 and/or expander, as an example. The intermediate-stage expansion valve 83 further reduces the pressure of the cooled methane stream, which reduces a temperature of the stream by vaporizing or flashing a portion of the stream. The resulting two-phase methane-rich stream output in a conduit 146 enters an intermediate-stage methane flash drum 84. Liquid and vapor portions of the stream are separated in the intermediate-stage flash drum 84 and output through conduits 148 and 150, respectively. The vapor portion (also called the intermediate-stage flash gas) in the conduit 150 re-enters the methane economizer 73, wherein the vapor portion is heated through an indirect heat exchange 77 of the main methane economizer 73. The resulting warmed stream is routed through a conduit 154 to the intermediate-stage inlet port of methane compressor 71.

The liquid stream exiting the intermediate-stage methane flash drum 84 through the conduit 148 passes through a low-stage expansion valve 85 and/or expander, whereupon the pressure of the liquefied methane-rich stream is further reduced to vaporize or flash a portion of the stream. The resulting cooled two-phase stream is output in a conduit 156 and enters a low-stage methane flash drum 86, which separates the vapor and liquid phases. The liquid stream exiting the low-stage methane flash drum 86 through a conduit 158 comprises the liquefied natural gas (LNG) product at near atmospheric pressure. This LNG product may be routed downstream for subsequent storage, transportation, and/or use.

A vapor stream exiting the low-stage methane flash drum 86 (also called the low-stage methane flash gas) in a conduit 160 is routed to the methane economizer 73. The methane economizer 73 warms the low-stage methane flash gas through an indirect heat exchange 78 of the main methane economizer 73. The resulting stream exits the methane economizer 73 through a conduit 164. The stream is then routed to a low-stage inlet port of the methane compressor 71.

The methane compressor 71 comprises one or more compression stages. In one implementation, the methane compressor 71 comprises three compression stages in a single module. In another implementation, one or more of the compression modules are separate but mechanically coupled to a common driver. Generally, one or more inter-coolers (not shown) are provided between subsequent compression stages.

As shown in FIG. 1, a compressed methane refrigerant stream exiting the methane compressor 71 is discharged into a conduit 166. The compressed methane refrigerant is routed to the methane cooler 72, and the stream is cooled through indirect heat exchange with an external fluid (e.g., air or water) in the methane cooler 72. The resulting cooled methane refrigerant stream exits the methane cooler 72 through a conduit 112 and is directed to and further cooled in the propane refrigeration cycle 30. Upon cooling in the propane refrigeration cycle 30 through a heat exchanger 37, the methane refrigerant stream is discharged into conduit 130 and subsequently routed to the main methane economizer 73, and the stream is further cooled through indirect heat exchange 79. The resulting sub-cooled stream exits the main methane economizer 73 through a conduit 168 and then combined with the stream in the conduit 122 exiting the high-stage ethylene chiller 53 prior to entering the low-stage ethylene chiller/condenser 55, as previously discussed.

In some cases, the feed to the LNG facility 100 contains heavy hydrocarbons ("heavy components") which freeze, precipitate, and collect in the high-stage ethylene chiller 53 or other chillers or cooling components of the LNG facility 100. In one implementation, a hydrocarbon solvent is injected into the process to reduce a freezing temperature of the heavy components in the natural gas feed, preventing the heavy components from freezing in the heat exchanger. For instance, a solvent injection system with a solvent supply and an atomizer can disperse the solvent into the natural gas feed at an injection point upstream from the heat exchanger. An injection controller can control a timing of the dispersal by controlling a flow of a solvent feed through an atomizer, for instance, based on sensor data received from one or more sensors or by adjusting amount of desired solvent flow through an injection pump (while omitting the one or more sensors). For example, small amounts of solvents can be injected with positive displacement injection pumps (e.g., metering pumps). If an atomization process is used, then positive displacement pumps can provide a very high discharge pressures (e.g., well over 1000 psi in some cases). With these style pumps, the stroke can be adjusted (e.g., to set the injection volume). Feedback sensors can be omitted and the stroke of the pump can be adjusted to output a particular rate (e.g., gallons per minute) of solvent. As such, flowmeters, temperature sensors, pressure sensors, etc. can be omitted. However, in scenarios using sensor data, the sensor data can indicate an amount of accumulation of heavy component solids in the heat exchanger so the injection controller can control a timing of the solvent injections accordingly.

As such, the solvent injection system reduces or eliminates accumulations of heavy component solids in the heat exchanger while causing little or no downtime for the heat exchanger. Reducing obstructions caused by freezing heavy components with the solvent injections improves the operating efficiency of the LNG processing facility 100.

Turning to FIG. 2, an example LNG production system 400 with a solvent injection system 402 is shown. The LNG production system 400 may be deployed in the LNG facility 100, for example, to prevent heavy hydrocarbon freezing in heat exchangers of the LNG production system 400 and/or other cooling or chilling components of the LNG production system 400. The LNG production system 400 may form at least a portion of any of the systems discussed herein.

Figure 3:
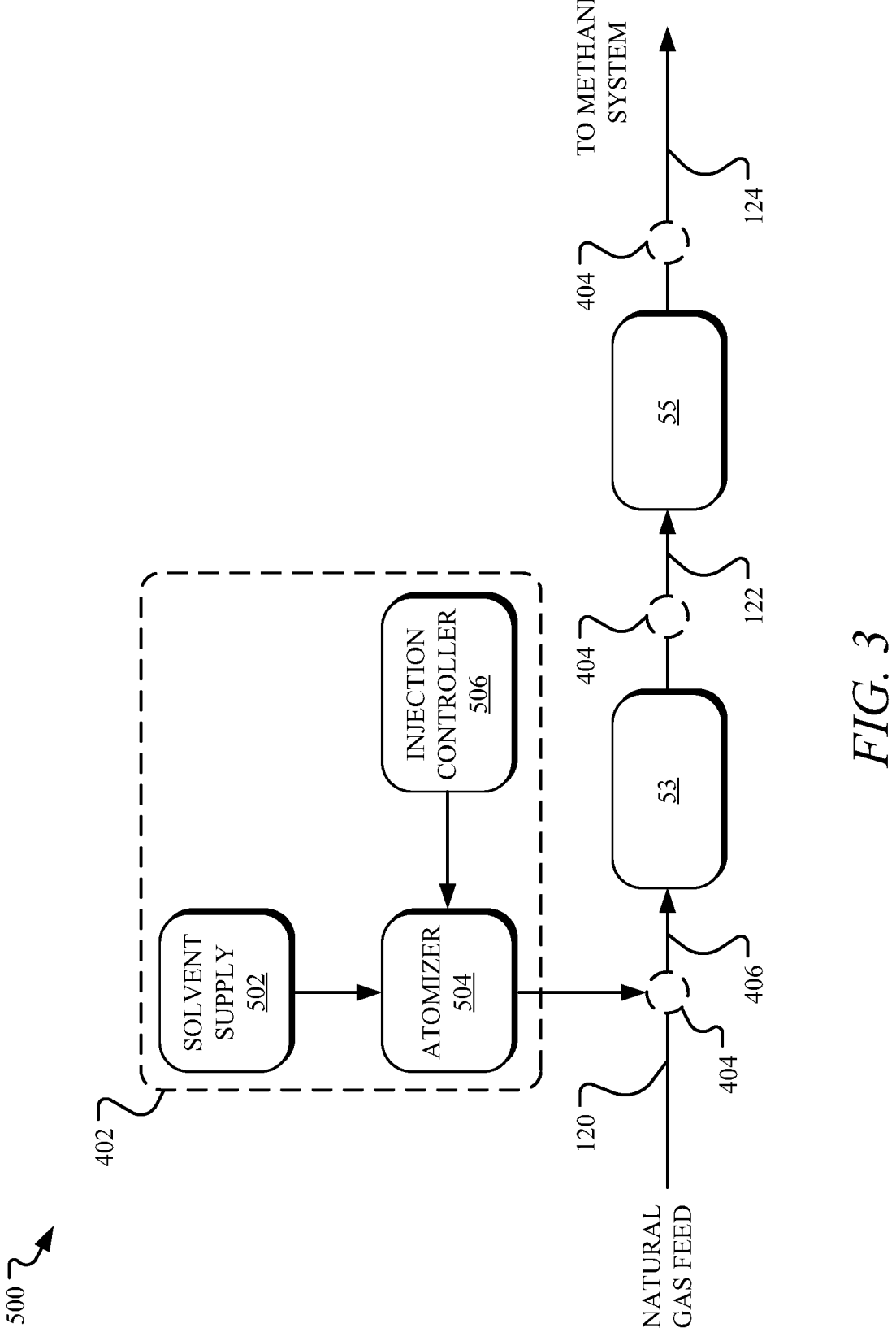
FIG. 3 illustrates an example LNG production system for injecting a solvent into a natural gas feed with a solvent injection system using a solvent supply, an atomizer, and an injection controller.
Figure 4:
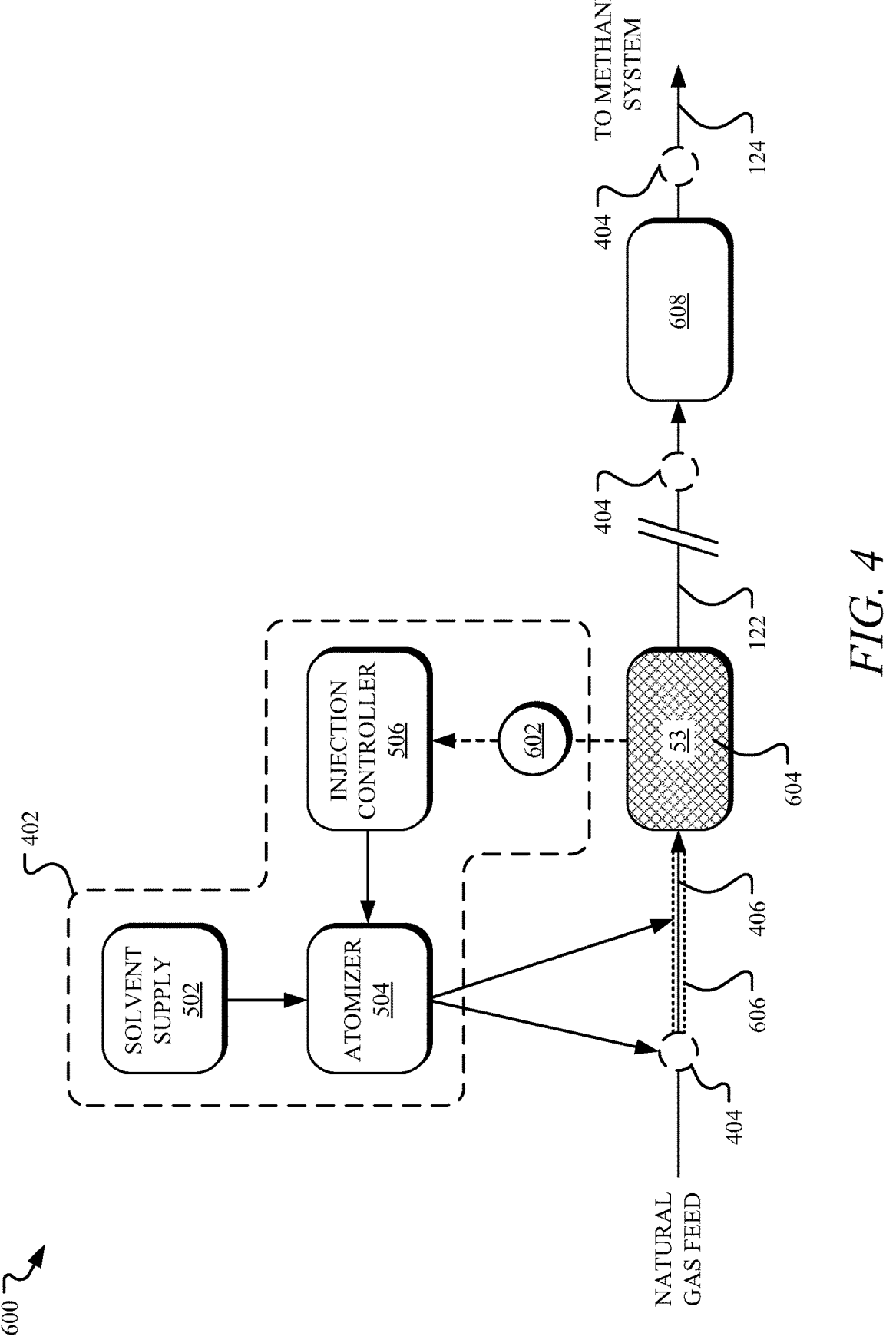
FIG. 4 illustrates an example LNG production system for injecting a solvent into a natural gas feed and onto a flow surface.

In one implementation, the solvent injection system 402 injects a solvent into a natural gas feed at a solvent injection point 404 of the LNG production system 400 to form a mixed feed 406 (e.g., a feed containing a mix of the natural gas with the solvent). The solvent injection point 404 can be disposed at various locations throughout the LNG production system 400. By way of example, FIG. 2 illustrates one or more solvent injection points 404 at the propane refrigeration cycle 30 where the solvent is injected into the natural gas feed to form the mixed feed 406. FIGS. 3 and 4 illustrate the solvent injection points at the ethylene refrigeration cycle 50.

For example, the solvent injection point 404 may be at the conduit 110 such that the mixed feed 406 is directed into the high-stage propane chiller 33A to prevent freezing of heavy components during the heat exchange 37 in the high-stage propane chiller 33A. Additionally or alternatively, the solvent injection point 404 may be at the conduit 114 for conveying the natural gas feed from the high-stage propane chiller 33A to the treatment system 40 and/or the intermediate-stage propane chiller 34. The solvent injection point 404 could be located at the conduit 116 for conveying the natural gas feed from the treatment system 40 and/or the high-stage propane chiller 33A to the intermediate-stage propane chiller 34, such that the mixed feed 406 prevents heavy components from freezing during the heat exchange 41 in the intermediate-stage propane chiller 34. The solvent injection point 404 could be located at the conduit 118 for conveying the natural gas feed from the intermediate-stage propane chiller 34 to the low-stage propane chiller 35. With the solvent injection point 404 disposed at this location, the mixed feed 406 prevents heavy components from freezing during the heat exchange 42 in the low-stage propane chiller 35. The solvent injection point 404 could be located at the conduit 120 for conveying the natural gas feed from the low-stage propane chiller 35 to the high-stage ethylene chiller 53. In other words, the solvent injection point 404 may be disposed between the propane refrigeration cycle 30 and the ethylene refrigeration cycle 50. In this example, the mixed feed 406 prevents heavy components from freezing during the heat exchange 59 in the high-stage ethylene chiller 53 and/or other cooling components of the ethylene refrigeration cycle 50, as discussed in greater detail below regarding FIG. 3.

The LNG production system 400 may include a single solvent injection point 404 or a plurality of solvent injection points 404, such as any combination of the solvent injection points discussed herein. The one or more solvent injection point(s) 404 may be at conduits (as discussed above), the solvent may be injected into the natural gas feed in a heat exchanger, such that the one or more injection point(s) 404 are upstream from or at the one or more of the high-stage propane chiller 33A, the intermediate-stage propane chiller 34, the low-stage propane chiller 35, the high-stage ethylene chiller 53, the low stage-ethylene chiller 55, and/or the like. Additionally or alternatively, the injection point(s) 404 may be at a specialized mixing tank for producing the mixed feed 406 upstream from the chiller or cooler (e.g., heat exchangers) into which the mixed feed is directed.

In some instances, the separator 47 has a bottom feed 408 that is sent to an HRU 410. Additionally or alternatively conduit 122 from the high-stage ethylene chiller 53 routes the portion of the cooled natural gas to the HRU 410. At the HRU 410, heavies in the cooled natural gas stream are removed as part of a condensate, and the "clean" gas is processed further downstream.

In some examples, the LNG production system 400 includes a solvent recovery unit 412 downstream from the injection point(s) 404, for instance, deployed between debutanizers and condensate tanks of the LNG train, or downstream from the HRU 410. The solvent recovery unit 412 may be located within the LNG train to balance an amount of solvent import into the LNG facility 100 with a quantity of solvent sufficient to curtail heavy hydrocarbon freezing and accumulation in the heat exchanger by recycling recovered solvent back to the solvent supply 502 and/or the solvent injection system 402. Alternatively, the process disclosed herein is a once-through process without solvent recovery for recycling. For instance, the solvent can exit the process as part of the condensate recovered in the NGL recovery system or LNG heavies removal process.

FIG. 3 illustrates an example LNG production system 500 with a solvent injection system 402 for preventing heavy hydrocarbon freezing in heat exchangers of the LNG facility 100, for instance, at the ethylene refrigeration cycle 50. The LNG production system 500 may form at least a portion of any of the systems discussed herein. In the example depicted in FIG. 3, the solvent injection system 402 includes a solvent supply 502, an atomizer 504, and an injection controller 506.

FIG. 3 shows the solvent injection point 404 located in the ethylene refrigeration cycle 50 at conduit 120 to produce the mixed feed 406 upstream from and directed into the high-stage ethylene chiller 53 (e.g., so that the mixed feed 406 prevents heavy component freezing during the heat exchange 59 in the high-stage ethylene chiller 53). Additionally or alternatively, the solvent injection point 404 is located downstream from the high-stage ethylene chiller 53 and upstream from the low-stage ethylene chiller/condenser 55 at conduit 122 (e.g. so that the mixed feed 406 prevents heavy component freezing during the heat exchange 63) and/or at conduit 124 downstream from the low-stage ethylene chiller/condenser 55 and upstream from the methane refrigeration cycle 70 (e.g., the methane economizer 73) to direct the mixed feed 406 into the methane refrigeration cycle 70.

In some examples, the solvent supply 502 may store and provide the solvent to the mixed feed 406 via the atomizer 504 and the injection controller 506. In some instances, the solvent is added to the feed of natural gas with one or more open ports into piping or equipment to receive the solvent. The solvent supply 502 may include a solvent tank or container for storing the solvent and can provide the solvent feed to a pump via suction tubing which, in turn, provides the solvent feed as a pressurized feed into the LNG production system 500.

In some instances, the solvent is selected for the system based on the solvent having a boiling point similar to the contaminant and/or a freezing point that is lower than the inlet temperature for the HRU 410 (shown in FIG. 2). The solvent can remain liquid across a broad range, have a similar vapor pressure to the heavy contaminant, such that the solvent and contaminant can drop in the separator 47. The liquid contaminant and solvent can then be removed from the bottom feed 408 of the separator 47 and the overhead gas can continue to the next step in liquefaction. The bottom feed 408 of the separator 47 can be sent directly to the HRU 410. Any contaminants/solvents that stay in the gas stream throughout the liquefaction process can be carried through to the HRU 410 and will avoid falling out or damaging the intermediate equipment because the solvent is mixed with the contaminant.

In some examples, the solvent may be one or more of isoparaffins, isoolefins, isobutane, isooctane, isodecane, isododecane, isotetradecane, isohexadecane, diisobutylene, tri-isobutylene, tetraisobutylene, petroleum naphtha, kerosene, or cold weather diesel. The solvent can include Soltrol-10 or Soltrol-100 Soltron 130 (e.g., of Chevron-Phillips®), or mixtures of isooctane, isododecane, and isohexadecane (hydrogenated versions of di-, tri- and tetr-isobutylene). The solvent can be Isopar C, Isopar G, Isopar H, Isopar J, Isopar K (e.g., of ExxonMobil®; and/or ShellSol TD, ShellSol T (e.g., of Shell®). In some instances, the solvent(s) is selected based on the solvent having a freezing point below −65° and/or between −65 to −70° C., or even below −70° C., such as between −70° C. to −75° C., (e.g., which can be the HRU inlet temperature).

In some examples, any of the solvents discussed herein can be blended to form a solvent mixture. The mixture can be blended to make an optimum blend at minimum injection quantity with a minimal or no negative effect on the value of the condensate product from the NGL recovery system. The solvent can include mixed hydrocarbons streams with low freezing points (e.g., freezing points below a freezing point of the heavy components). The solvent may include one or more hydrocarbons in the C7 to C13 boiling range. In some instances, the solvent has a freezing point and/or a freezing point depression constant that causes freezing point depression for the heavy components (e.g., shifting the heavy component freezing temperature below the temperatures occurring in the mixed feed 406 at the heat exchangers). The solvent may have colligative properties matching particular characteristics of a particular heat exchanger or characteristics of the natural gas feed at a particular heat exchanger to cause freezing point depression for the heavy compounds in that heat exchanger. For instance, the solvent can be selected based on the boiling point of the freezing heavy component being targeted and the freezing point of the solvent selected. The particular solvent can be based on the boiling point of the heavy component (e.g., contaminant) and the solvent can be injected at a concentration such that the condensed liquid is near the eutectic freezing point for a blend of the solvent and the heavy components. In one example, a first solvent is used in the propane cycle heat exchangers and a second solvent is used in the ethylene heat exchangers or methane heat exchangers, which may be a different solvent than the first solvent.

The solvent feed can exit the solvent supply 502 or the solvent injection system 402 through the atomizer 504 which sprays or mists the natural gas feed with the solvent via an atomization process. The atomizer 504 is communicatively coupled to the solvent supply and can include an atomizer nozzle for dispersing the solvent into the natural gas feed as tiny droplets. The atomizer 504 can provide a continuous spray or a periodic or intermittent spray, for instance, controlled by the injection controller 506, (e.g., via mechanical switches and/or one or more electrical signals sent from the injection controller 506). Moreover, the solvent injection system 402 can include a hydraulic nozzle, an open port (e.g., in piping conveying the solvent), an injection nozzle (e.g., with narrow enough ports to create atomization), a valve, or other dispersal mechanism to disperse the solvent into the natural gas feed in addition to or alternatively to the atomizer 504. The solvent injection system 402 can use a turbulence of the fluid flow in the piping to mix the solvent into the natural gas feed.

The injection controller 506 may be communicatively coupled to one or more control valves, flow regulators, or switches for regulating a flow of the solvent feed to the atomizer 504 and/or into the natural gas feed at the injection point 404. The injection controller 506 can include a mechanical or analog controller (e.g., one or more switches and/or timers) and can include non-transitory memory device(s) (e.g., storing executable instructions), a processor, one or more input/output (I/O) ports, and one or more communication interfaces. The injection controller 506 can receive sensor data from one or more sensors (e.g., one or more sensors 602 in FIG. 4) and cause the atomizer 504 to disperse the solvent into the natural gas feed based on sensor data. The injection controller 506 can control the atomization process and cause the solvent injection system 402 to inject a particular amount of solvent into the natural gas feed to produce the mixed feed 406 with a particular solvent concentration. For instance, the mixed feed 406 may have a solvent concentration of one to 1000 parts per million (ppm) by weight or 20 to 100 parts ppm by weight. In some examples, solvent dispersal characteristics such as a particular solvent or solvent type, a solvent concentration, a solvent temperature, and/or a dispersal timing of solvent injection at one or more solvent injection points 404 is selected for a particular heat exchanger. Moreover, the solvent dispersal characteristics can be controlled based on conditions at the heat exchanger and adjusted during operation of the LNG production system 500, as discussed in greater detail below regarding FIG. 4. In some examples, the solvent injection system 402 includes a heater for increasing a temperature of the solvent (e.g., from a storage temperature at the solvent supply 502 to a dispersal temperature at the atomizer 504). The heater is controlled by the injection controller 506 and is positioned anywhere along the solvent feed in the solvent injection system 402 (e.g., at the solvent supply 502 or at a conduit between the solvent supply 502 and the atomizer 504, or at the atomizer 504) to heat the solvent feed prior to atomization of the solvent. Increasing the dispersal temperature of the solvent can increase the degree of liquid atomization, improving mixing of the solvent into the natural gas feed.

In some examples, the mixed feed 406 may be a first mixed feed directed into a feed chill heat exchanger (e.g., a heat exchanger for chilling the natural gas feed), such as the high-stage ethylene chiller 53 or the low-stage ethylene chiller 55. The first mixed feed may have a first concentration of the solvent that prevents a fouling portion of the heavy components from freezing in the feed chill heat exchanger. The fouling portion may be a percentage of the heavy components great enough to affect a flow of the natural gas feed should it freeze in the feed chill heat exchanger. The fouling portion may be all of the heavy components or some of the heavy components. A second mixed feed can be outputted from the feed chill heat exchanger, the second mixed feed including a second concentration of the solvent. The second concentration may be a same concentration as the first concentration or the second concentration may be a different concentration (e.g., as a result of some freezing or losing other substances from the mixed feed 406 during the heat exchange process). Either way, the second concentration of the solvent in the second mixed feed may further prevent freezing in a second component of the LNG production system 500 downstream from the feed chill heat exchanger, such as a second feed chill heat exchanger or another type of LNG processing component, as discussed in greater detail below regarding FIG. 4

FIG. 4 illustrates an example LNG production system 600 with a solvent injection system 402 for preventing heavy hydrocarbon freezing in heat exchangers of the LNG facility 100, for instance, at the ethylene refrigeration cycle 50. The LNG production system 500 may form at least a portion of any of the systems discussed herein. As depicted in FIG. 4, the solvent injection system 402 can include the solvent supply 502, the atomizer 504, and the injection controller 506, and one or more sensor(s) 602.

In some examples, the solvent injection system 402 can include the one or more sensor(s) 602 to detect and generate sensor data indicating heat exchanger characteristics (e.g., indicating an amount of accumulation 604 of solids from freezing in the heat exchanger) and/or solvent dispersal characteristics, and providing the sensor data to the injection controller 506. For instance, the one or more sensor(s) 602 may detect the amount of accumulation 604 based on image data from a camera, flow rate data indicating a change in flow rate corresponding to an obstruction at the heat exchanger, and/or pressure data indicating a pressure drop or change in the heat exchanger caused by the accumulation 604. Additionally, the one or more sensor(s) 602 may include temperature sensors to determine temperatures of the heat exchanger and the mixed feed 406 flowing through the heat exchanger. The dispersal characteristics detected by the sensor(s) 602 and represented by sensor data can include a solvent concentration in the mixed feed 406, a solvent temperature at the solvent supply 502 or the atomizer 504, a solvent dispersal interval, a solvent pause interval, a solvent dispersal frequency, a solvent dispersal duration, and/or combinations thereof. The injection controller 506 may receive the sensor data and cause a change to one or more of the heat exchanger characteristics or solvent dispersal characteristics when the heat exchanger characteristics or solvent dispersal characteristics fall below predetermined thresholds and/or by implementing a target value for the heat exchanger characteristics or solvent dispersal characteristics.

The sensor(s) 602 can be placed at multiple places throughout the solvent injection system 402 and the LNG production system 600. (e.g., including internal or external components of the heat exchanger), such as at the natural gas feed, the mixed feed 406, the solvent supply 502, the atomizer 504, and/or the flow surface. In some instances, the concentrations of solvents injected at different solvent injection points 404 may vary with respect to each other and be changed based on the sensor data to continual adjust solvent characteristics (e.g., concentrations) in the mixed feeds as needed to melt detected accumulations of freezing heavy components and/or to prevent accumulations of freezing heavy components. The heat exchanger may be in an operating mode during the melting of the accumulations 604 and, accordingly, downtime may be reduced and the overall efficiency of the LNG production system 600 improved by the solvent injection system 402.

In some examples, the solvent injection system 402 can provide a solvent injection onto a flow surface for the natural gas feed or the mixed feed 406 to create a solvent film 606 on the flow surface. The solvent film 606 may be upstream or downstream from the solvent injection point 404 or at the solvent injection point 404. For instance, the flow surface may be an inner surface of piping that forms one or more conduits (e.g., conduit 116, conduit 118, conduit 120, conduit 122, and/or conduit 124, etc.). The flow surface may be an inner surface of the heat exchanger (e.g., the high-stage ethylene chiller 53, the low-stage ethylene chiller 55, etc.) or a surface of an additional LNG processing component 608, or any other surface of the LNG production system 600 that contacts the natural gas feed or mixed feed 406 containing a potentially fouling portion of the heavy components (e.g., in a vapor form or a mixed vapor/liquid form). The solvent film 606 can coat or partially coat the flow surface with the solvent.

In some examples, the LNG production system 600 includes an additional LNG processing component 608 to receive the mixed feed 406 which prevents freezing of heavy components in the additional LNG processing component 608. The additional LNG processing component 608 may be a propane condenser feed chiller, an ethylene condenser feed chiller, an ethylene feed condenser, a debutanizer, or a heavies removal column. The additional processing component may be upstream from the high-stage ethylene chiller 53 and/or downstream from the high-stage ethylene chiller 53.

FIG. 5 illustrates example operations of a method 700 for solvent injection, which may be performed by any of the systems discussed herein. In some instances, an operation 702 directs a solvent from a solvent supply (e.g., the solvent supply 502) to a solvent injection point (e.g., the one or more solvent injection point(s) 404) in an LNG facility (e.g., the LNG facility 100). An operation 704 increases a temperature of the solvent with a heater, for instance, prior to an atomization process. Increasing the temperature can increase a degree of atomization of the solvent during the atomization process.

An operation 706 injects the solvent into a feed of natural gas containing heavy components at the solvent injection point (e.g., the one or more solvent injection point(s) 404). An operation 708 produces a mixed feed (e.g., the mixed feed 406) from a dispersal of the solvent into the feed of natural gas (e.g., via the atomization process). An operation 710 directs the mixed feed 406 into a feed chill heat exchanger (e.g., the high-stage ethylene chiller 53, the low-stage ethylene chiller 55, etc.). The mixed feed 406 may be directed into the feed chill heat exchanger via the one or more conduits. An operation 712 prevents a potentially fouling portion of the heavy components (e.g., a percentage or portion of the heavy components that may accumulate and/or restrict a flow of the mixed feed 406 through the feed chill heat exchanger) from freezing in the feed chill heat exchanger. For instance, the solvent in the mixed feed 406 may lower a freezing temperature of the heavy components below a temperature occurring in the feed chill heat exchanger.

FIG. 6 illustrates example operations of a method 800 for solvent injection, which may be performed by any of the systems discussed herein. In some instances, an operation 802 directs a solvent from a solvent supply (e.g., the solvent supply 502) to one or more solvent injection points (e.g., the one or more solvent injection point(s) 404) in an LNG facility (e.g., the LNG facility 100). An operation 804 injects the solvent into a natural gas feed at the one or more solvent injection points (e.g., the one or more solvent injection point(s) 404), for instance, by passing the solvent through the atomizer 504, to form a mixed feed (e.g., the mixed feed 406). An operation 806 injects the solvent onto a flow surface of the natural gas feed or the mixed feed 406 (e.g., the flow surface discussed above regarding FIG. 4) to form a solvent film (e.g., the solvent film 606) on the flow surface. The solvent can be injected onto the flow surface with the same solvent injection that produces the mixed feed 406, with a different solvent injection that produces the mixed feed 406, or with a combination thereof.

An operation 808 directs the natural gas feed or the mixed feed 406 to contact the flow surface. For instance, the flow surface may be an inner surface of a conduit for conveying a vapor/fluid mixture of the natural gas feed or the mixed feed 406, or the flow surface may be an inner surface of the feed chill heat exchanger. An operation 810 melts or dissolves heavy components (e.g., a crystal or a solid of the heavy component formed by freezing) in the natural gas feed or the mixed feed 406 by contacting the flow surface and the solvent film 606 on the flow surface. An operation 812 prevents a potentially fouling portion of the heavy components in the mixed feed 406 (e.g., a percentage of the heavy components that could accumulate and/or restrict a flow of the mixed feed 406 through the feed chill heat exchanger) from freezing in the feed chill heat exchanger. For instance, the solvent mixed into the mixed feed 406 may lower a freezing temperature of the heavy components below a temperature occurring in the feed chill heat exchanger.

Figure 7:
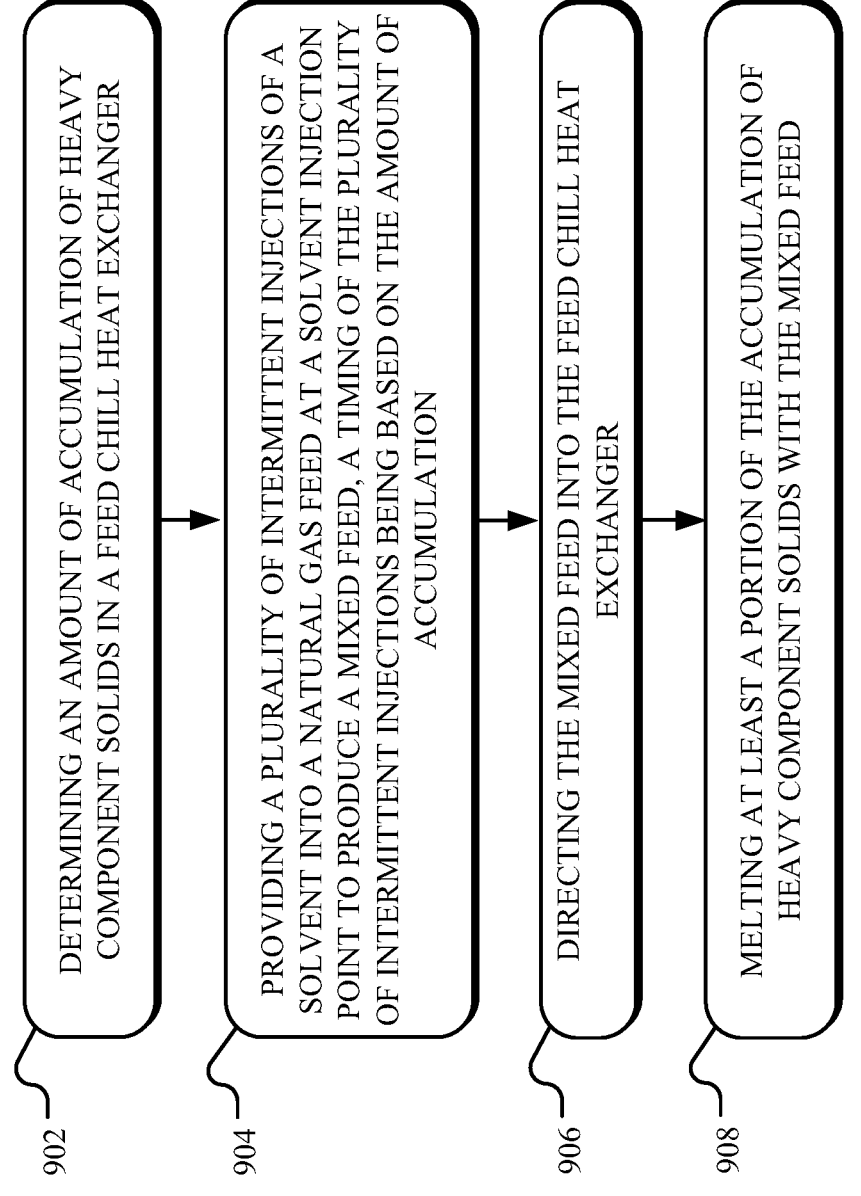
FIG. 7 illustrates an example method of solvent injection to melt an accumulation of heavy components.

FIG. 7 illustrates example operations of a method 900 for solvent injection, which may be performed by any of the systems discussed herein. In some instances, an operation 902 determines an amount of accumulation (e.g., the accumulation 604 discussed above regarding FIG. 4) of heavy component solids in a feed chill heat exchanger. For instance, the one or more sensor(s) 602 may identify the accumulation of solids via imaging data and/or by detecting a change of flow rate or pressure in the feed chill heat exchanger. An operation 904 provides a plurality of intermittent injections of a solvent into a natural gas feed at a solvent injection point (e.g., the one or more solvent injection point(s) 404) to produce a mixed feed (e.g., the mixed feed 406), a timing of the plurality of intermittent injections being based on the amount of accumulation 604. For instance, the injection controller 506 of the solvent injection system 402 may actuate a switch or valve causing the atomizer 504 to disperse the solvent at least partly in response to the amount of accumulation 604.

An operation 906 directs the mixed feed 406 into the feed chill heat exchanger. For instance, the mixed feed 406 may undergo a cooling process in high-stage ethylene chiller 53, and may be directed to the high-stage ethylene chiller 53 by the conduit 120. The conduit 120 or the high-ethylene chiller 53 could include the flow surface with the solvent film 606. An operation 908 melts or dissolves at least a portion of the accumulation 604 of heavy component solids with the mixed feed 406. The mixed feed 406 may contact the accumulation 604 of heavy components so that the solvent concentration in the mixed feed 406 causes the accumulation 604 to at least partially melt (e.g., by lowering a freezing temperature of the heavy components and/or by heating the heavy components).

It is to be understood that the specific order or hierarchy of steps in the methods depicted in FIGS. 5-7 are instances of example approaches and can be rearranged while remaining within the disclosed subject matter. For instance, any of the steps depicted in FIGS. 5-7 may be omitted, repeated, performed in parallel, performed in a different order, and/or combined with any other of the steps depicted in FIGS. 5-7. Any accompanying method claims thus present elements of the various steps in a sample order and are not necessarily meant to be limited to the specific order or hierarchy presented unless explicitly stated.

Moreover, it will be appreciated that the various example LNG production systems 400-600 are exemplary only and other systems or modifications to these systems may be used to eliminate or otherwise reduce fouling in one or more heat exchangers, such as the high-stage ethylene chiller 53 or other feed chill heat exchangers of the LNG facility 100 in accordance with the presently disclosed technology.

While the present disclosure has been described with reference to various implementations, it will be understood that these implementations are illustrative and that the scope of the present disclosure is not limited to them. Many variations, modifications, additions, and improvements are possible. More generally, implementations in accordance with the present disclosure have been described in the context of particular implementations. Functionality may be separated or combined in blocks differently in various implementations of the disclosure or described with different terminology. These and other variations, modifications, additions, and improvements may fall within the scope of the disclosure as defined in the claims that follow.

What is claimed is:

1. A method for reducing hydrocarbon fouling, the method comprising:
    injecting a solvent into a feed of natural gas at a solvent injection point, the feed containing heavy components, the solvent injection point positioned upstream from a feed chiller heat exchanger, wherein injecting the solvent into the feed of natural gas includes directing the solvent onto a flow surface that conveys the feed of natural gas to form a solvent film on the flow surface upstream from the feed chiller heat exchanger;
    producing a mixed feed from a dispersal of the solvent into the feed of natural gas, the mixed feed containing the heavy components;
    directing the mixed feed into the feed chiller heat exchanger; and
    preventing the heavy components of the mixed feed from freezing into a fouling portion in the feed chiller heat exchanger using the solvent including the solvent film formed on the flow surface.

2. The method of claim 1, wherein the mixed feed includes between one and 10000 parts per million by weight of the solvent.

3. The method of claim 1, wherein the solvent includes one or more of isoparaffins, isoolefins, isobutane, isooctane, isodecane, isododecane, isotetradecane, isohexadecane, diisobutylene, tri-isobutylene, tetraisobutylene, petroleum naphtha, kerosene, or cold weather diesel.

4. The method of claim 1, wherein the solvent includes an isoparaffin with a freezing point between −65° C. and −75° C.

5. The method of claim 1, wherein the mixed feed is a first mixed feed, the method further comprising:
    outputting, from the feed chiller heat exchanger, a second mixed feed including the fouling portion of the heavy components.

6. The method of claim 5, wherein a concentration of the solvent in the second mixed feed prevents the fouling portion of the heavy components from freezing downstream of the feed chiller heat exchanger.

7. The method of claim 1, wherein the feed chiller heat exchanger is a propane feed chiller or an ethylene feed chiller of a cascading liquid natural gas (LNG) system.

8. The method of claim 1, wherein the solvent is a first solvent, the solvent injection point is a first solvent injection point, and further comprising injecting a second solvent into the feed of natural gas at a second solvent injection point, the second solvent being a different solvent than the first solvent.

9. The method of claim 1, wherein injecting the solvent into the feed of natural gas includes a plurality of intermittent injections of the solvent at the solvent injection point, and the method further includes determining an amount of an accumulation of solids in the feed chiller heat exchanger, a timing of the plurality of intermittent injections is based at least partly on the amount of the accumulation of solids.

10. A method for reducing hydrocarbon fouling, the method comprising:

injecting a solvent into a feed of natural gas at a solvent injection point, the feed containing heavy components, the solvent injection point positioned upstream from a heat exchanger, chiller, debutanizer, or condenser, wherein injecting the solvent into the feed of natural gas includes injecting the solvent onto a flow surface that conveys the feed of natural gas to form a solvent film on the flow surface upstream from the feed chiller heat exchanger;

producing a mixed feed from a dispersal of the solvent into the feed of natural gas, the mixed feed containing the heavy components;

directing the mixed feed into the feed of the heat exchanger, the chiller, the debutanizer, or the condenser downstream from the solvent injection point; and preventing, using the solvent including the solvent film formed on the flow surface, the heavy components of the mixed feed from freezing into a fouling portion in the heat exchanger, the chiller, the debutanizer, or the condenser.

11. The method of claim 10, further comprising:

melting, with the mixed feed, an accumulation of solids in the heat exchanger, the chiller, the debutanizer, or the condenser.

12. The method of claim 11, wherein the heat exchanger, the chiller, the debutanizer, or the condenser is in an operating mode during the melting of the accumulation of solids.

13. The method of claim 10, wherein a boiling point of the solvent corresponds to a boiling point of C7 to C13 hydrocarbons.

14. The method of claim 10, wherein the dispersal of the solvent into the feed of natural gas includes dispersing the solvent into the feed of natural gas with an open port for injection or an injection nozzle.

15. The method of claim 10, wherein the dispersal of the solvent into the feed of natural gas includes a liquid atomization process that disperses the solvent as droplets into the feed of natural gas.

16. The method of claim 15, wherein the liquid atomization process includes increasing a pressure or a temperature of the solvent prior to adding the solvent into the feed of natural gas.

17. The method of claim 10, further comprising removing the solvent and the heavy components using a heavies removal unit (HRU) downstream from the heat exchanger, the chiller, the debutanizer, or the condenser.

18. A system for reducing hydrocarbon fouling, the system comprising:

an injection system injecting a solvent into a feed of natural gas containing heavy components at a solvent injection point, the solvent injection point positioned upstream from a feed chiller heat exchanger, wherein injecting the solvent into the feed of natural gas includes injecting the solvent onto a flow surface that conveys the feed of natural gas to form a solvent film on the flow surface upstream from the feed chiller heat exchanger; and a mixed feed produced from a dispersal of the solvent including the solvent film formed on the flow surface into the feed of natural gas, the mixed feed containing the natural gas and the heavy components.

19. The system of claim 18, further comprising a controller controlling a flow of the feed of natural gas based on sensor data including solvent dispersal characteristics.

* * * * *